US010761932B2

(12) United States Patent
Lingarajappa (10) Patent No.: US 10,761,932 B2
(45) Date of Patent: Sep. 1, 2020

(54) DATA AND METADATA STORAGE IN STORAGE DEVICES

(71) Applicant: Hewlett Packard Enterprise Development LP, Houston, TX (US)

(72) Inventor: Chetan Bendakaluru Lingarajappa, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 70 days.

(21) Appl. No.: 16/225,512

(22) Filed: Dec. 19, 2018

(65) Prior Publication Data
US 2020/0133773 A1 Apr. 30, 2020

(30) Foreign Application Priority Data
Oct. 25, 2018 (IN) .............................. 201841040340

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 11/1004* (2013.01); *G06F 2211/104* (2013.01)

(58) Field of Classification Search
CPC .................................................. G06F 11/1076
USPC ................. 714/807, 804, 801, 808
See application file for complete search history.

(56) References Cited

U.S. PATENT DOCUMENTS

| 5,918,232 | A  | * | 6/1999  | Pouschine  | G06F 16/283 |
| 5,931,947 | A  | * | 8/1999  | Burns      | G06F 21/6209 726/4 |
| 7,653,847 | B1 | * | 1/2010  | Liikanen   | G01R 33/1207 360/31 |
| 8,190,832 | B2 |   | 5/2012  | Dickey et al. | |
| 8,458,145 | B2 |   | 6/2013  | Kopylovitz et al. | |
| 8,539,193 | B2 |   | 9/2013  | Yochai et al. | |
| 8,738,846 | B2 |   | 5/2014  | Son et al. | |
| 2008/0256183 | A1 | * | 10/2008 | Flynn | G06F 3/0643 709/204 |
| 2011/0106909 | A1 | * | 5/2011 | Gladwin | G06F 11/1004 709/217 |
| 2017/0097770 | A1 | * | 4/2017 | Mitkar | G06F 3/065 |

OTHER PUBLICATIONS

Hewlett Packard Enterprise, HPE XP7 Support of T10 PI with Oracle Data Integrity Extension (DIX), Aug. 2017, 3 pages, <https://support.hpe.com/hpsc/doc/public/display.

(Continued)

*Primary Examiner* — Fritz Alphonse
(74) *Attorney, Agent, or Firm* — Hewlett Packard Enterprise Patent Department (57) ABSTRACT

In an example, a storage device includes a plurality of pages, a main page table structure, and an auxiliary page table structure. The main page table structure includes a first data mapping between a logical address of first data and a first physical address pointing to a first data page. Further, the auxiliary page table structure includes a first metadata mapping between a logical address of first metadata and a second physical address pointing to a first metadata page.

20 Claims, 7 Drawing Sheets

(56) References Cited

OTHER PUBLICATIONS

Holt, K., "End-to-End Data Protection Justification," Jul. 1, 2003, 7 pages, http://www.t10.org/ftp/t10/document.03/03-224r0.pdf.
Petersen, "Block/SCSI Data Integrity Support," Apr. 25, 2008, 4 pages, <https://lwn.net/Articles/280023/>.
Petersen, "I/O Controller Data Integrity Extensions," Nov. 19, 2009, 9 pages, <https://oss.oracle.com/~mkp/docs/dix.pdf>.
Red Hat, Inc., "What is DIF/DIX (also known as PI)? Does Red Hat support it?," May 2, 2017, 2 pages, <https://access.redhat.com/solutions/41548>.
Richard Vanderbilt, "Why Data Integrity is important to you," 2008, <https://www.snia.org/sites/default/education/tutorials/2008/fall/storage/RichardVanderbilt_Why_Data_Integrity_rev2.pdf>.
Wikipedia, "Data Integrity Field," Mar. 25, 2018, 2 pages, <https://en.wikipedia.org/w/index.php?title=Data_Integrity_Field&oldid=832405956>.

\* cited by examiner

DATA AND METADATA STORAGE IN STORAGE DEVICES

PRIORITY INFORMATION

This application claims priority to IN Application No. 201841040340, filed on Oct. 25, 2018. The contents of which are incorporated herein by reference in its entirety.

BACKGROUND

A storage device may be used to store data written by a host device. In addition to the data, metadata of the data may also be stored in the storage device. The metadata may include checksum or cyclic redundancy check (CRC) of the data.

BRIEF DESCRIPTION OF DRAWINGS

The following detailed description references the figures, wherein.

DETAILED DESCRIPTION

A storage space of a storage device may be used to store data written by a host device. The storage space may include a plurality of equal-sized portions, which are referred to as pages. In some cases, for the data storage, a logical representation of the storage space may be presented to the host device, and a mapping between the logical representation and the storage space may be provided, for example, by a system including the storage device. Such a mapping facilitates efficient utilization of the storage space.

Sometimes, in addition to data, metadata of the data is also stored in the pages of the storage device. The metadata may be, for example, data integrity field (DIF) of the data, which is generated based on the data and may be used to verify integrity of the data. The metadata may be appended to the data when the host device sends the data to the storage device for being written. When the data is read from the storage device, the metadata may also be read.

Generally, when the data is written to the storage device, the metadata of the data is stored along with the data. For instance, when a chunk of data is stored in a sector of the storage device, the metadata of the chunk is also stored in the same sector. Since the data and metadata are stored together, the data and the metadata may have to be managed together. For instance, it may not be possible to move the data from one location to another for data tiering purposes independently of the metadata. Further, when the metadata is DIF for the data, for each 512 bytes of data, the corresponding DIF may be 8 bytes in size. Therefore, to store each 512 bytes of data along with its 8 bytes of DIF in a sector, the sectors in the storage device are to be 520 bytes in size. Such sectors may be referred to as 520 byte sectors. Storage devices having 520 byte sectors are expensive, for example, as compared to storage devices having 512 byte sectors.

The present subject matter relates to storage of data and metadata in storage devices. With the implementations of the present subject matter, data can be managed independently of the metadata of the data.

In accordance with an example implementation, a storage device includes a plurality of pages, a main page table structure, and an auxiliary page table structure. The main page table structure may be used to store mapping between logical address of data and physical address of data and the auxiliary page table structure may be used to store mapping between logical address of metadata and physical address of metadata, as explained below:

When first data and first metadata of the first data are received from a host device, a first data mapping is created in the main page table structure between a logical address of the first data and a first physical address. The first physical address points to a first data page of the plurality of pages. Also, a first metadata mapping is created in the auxiliary page table structure between a logical address of the first metadata and a second physical address. The second physical address points to a first metadata page of the plurality of pages. In addition, the first data is written to the first data page and the first metadata is written to the first metadata page. In an example, the logical address of the first metadata may be same as the logical address of the first data.

The first metadata may include data protection information for the first data that may be used to detect corruption of the first data. The first metadata may include, for example, a checksum, a cyclic redundancy check (CRC) value (which may be referred to as a "CRC" herein), or the like, of the first data. In an example, the first metadata may be DIF for the first data.

The present subject matter enables storing metadata of data in pages which are different from pages that store the data. Therefore, disk drives having sectors that store both a block of data and its DIF value together, such as sectors having 520 bytes, are not be used. Further, the present subject matter enables accessing the metadata pages independently of the data pages using an auxiliary page table structure. Therefore, the data and its metadata can be managed independently of each other. Further, the main page table structure and the auxiliary page table structure can be formed using pages of the storage device itself, thereby being simple to implement.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Example implementations of the present subject matter are described with regard to data integrity field (DIF) of data. Although not described, it will be understood that the implementations of the present subject matter can be used any type of metadata that is generally written and read along with the data it corresponds to.

Figure 1:
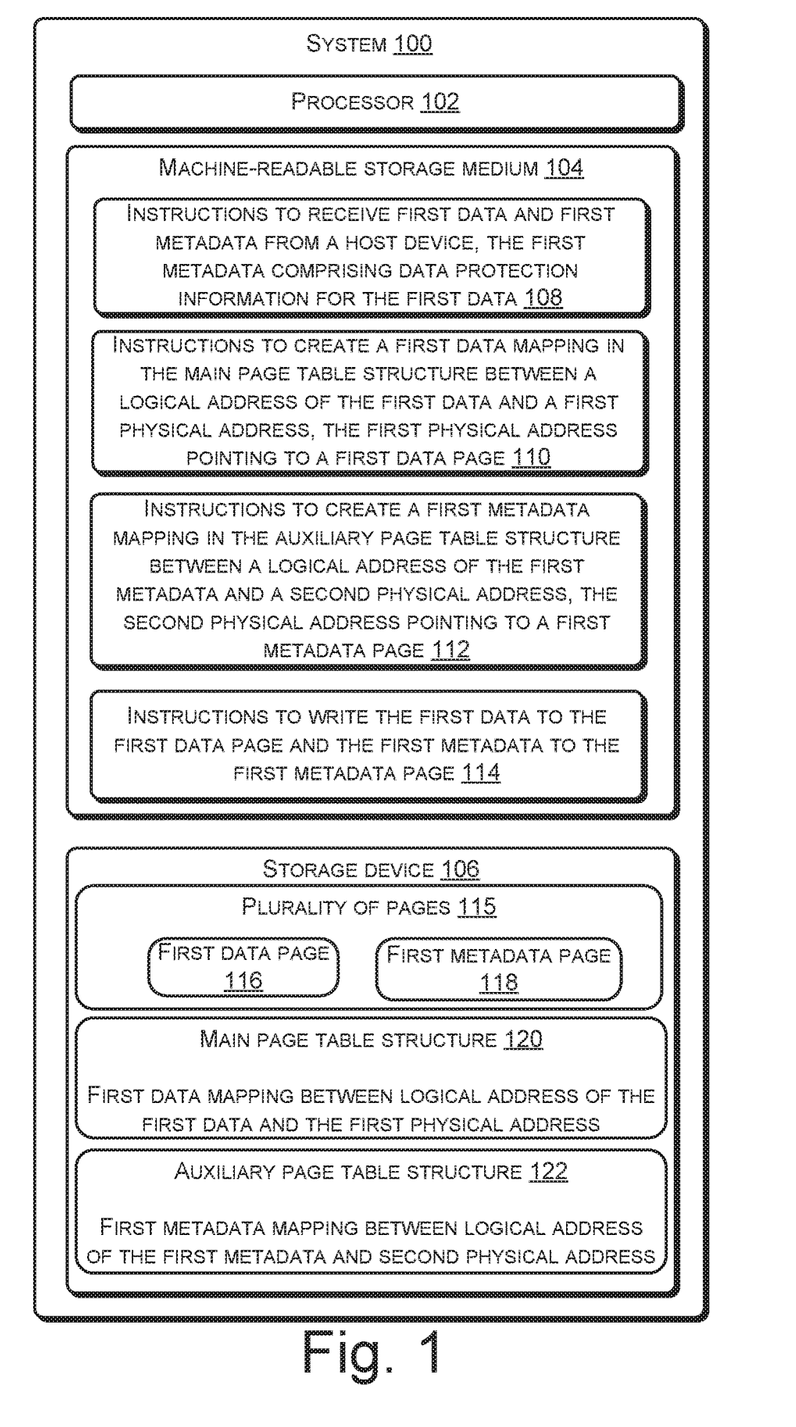
FIG. 1 illustrates a system to facilitate data and metadata storage in storage devices, according to an example implementation of the present subject matter.

FIG. 1 illustrates a system 100 to facilitate data and metadata storage in storage devices, according to an example implementation of the present subject matter. The system 100 may be implemented as any of a variety of computing systems, such as a desktop computer, a laptop computer, a server, and the like. In an example, the system 100 may be implemented as a storage system having a plurality of storage devices to which data may be written by host devices. The system 100 includes a processor 102, a machine-readable storage medium 104, and a storage device 106.

In addition to the processor 102, machine-readable storage medium 104, and storage device 106, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 can fetch and execute computer-readable instructions included in the machine-readable storage medium 104. The computer-readable instructions, hereinafter referred to as instructions, include instructions 108, instructions 110, instructions 112, and instructions 114. The functions of the processor 102 may be provided through the use of dedicated hardware as well as hardware capable of executing machine readable instructions.

The machine-readable storage medium 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

The storage device 106 may be used to store data from a host device, such as a server. The storage device 106 may be, for example, a hard disk or a solid state disk.

When the system 100 is a storage system, the processor 102 and the machine-readable storage medium 104 may be implemented as part of a storage controller that controls the storage system. The storage controller may provide a virtual representation of a storage space of the storage device 106 to the host device. If the system 100 includes any storage device other than the storage device 106, the virtual representation provided by the storage controller may include a virtual representation of the storage space of both the storage device 106 and the other storage device. The storage space of the storage device 106 and other storage device of the system 100 (if any) may be referred to as the storage space of the system 100. The storage controller may handle a mapping between the virtual representation and the storage space to facilitate writing data to and reading data from the storage device 106.

In an example, the storage space of the storage device 106 may include a plurality of equal-sized portions, each of which can store data written by the host device. The plurality of portions is referred to as plurality of pages 115 or pages 115. A page may be referred to as a unit of space allocation or deletion. Further, a page may include one or more storage device sectors, each of which may be a subdivision of a track on the storage device 106. The storage device sectors will be hereinafter referred to as sectors. A page may include a plurality of contiguous sectors, i.e., sectors that are adjacent each other. Each page may be individually addressed, i.e., pointed to, by an entry in a page table (not shown in FIG. 1) of a page table structure. Accordingly, a size, i.e., a storage capacity, of each page may be determined based on a size of the page table structure to be provisioned. In an example, the size of each page may be 16 Kilobytes (16 KB). In another example, the size of each page may be 4 KB.

As mentioned earlier, the system 100 may handle a mapping between the virtual representation provided to the host device and the storage space. To facilitate the mapping, the system 100 may include page table structures, which may be used to store mappings between logical addresses and physical addresses of data and metadata. The page table structures may include a main page table structure 120 and an auxiliary page table structure 122, and may be populated when the instructions 108-114 are executed by the processor 102, as will be explained below.

When executed by the processor 102, the instructions 108 facilitate receiving the first data and the first metadata from the host device. The first data and the first metadata may have to be written to the storage device 106. In an example, the first metadata may include data protection information for the first data. The data protection information for the first data may refer to information that is useable to detect at least one error in the first data (e.g., corruption of the first data), correct the at least one error, or a combination thereof. The data protection information will be explained in greater detail with reference to FIG. 2.

The instructions 110 enable creating a mapping in the main page table structure 120 between a logical address of the first data and a first physical address. The first physical address may point to a page of the pages 115. The page pointed by the first physical address may be referred to as a first data page 116, as the page is to be used to store data.

The instructions 112 enable creating a mapping in the auxiliary page table structure 122 between a logical address of the first metadata and a second physical address. The second physical address may point to another page of the pages 115. The page pointed by the second physical address may be referred to as a first metadata page 118, as the page is to be used to store metadata.

Further, the instructions 114 enable writing the first data to the first data page 116 and the first metadata to the first metadata page 118.

The actions performed by the various instructions are explained in greater detail with reference to subsequent figures.

Figure 2:
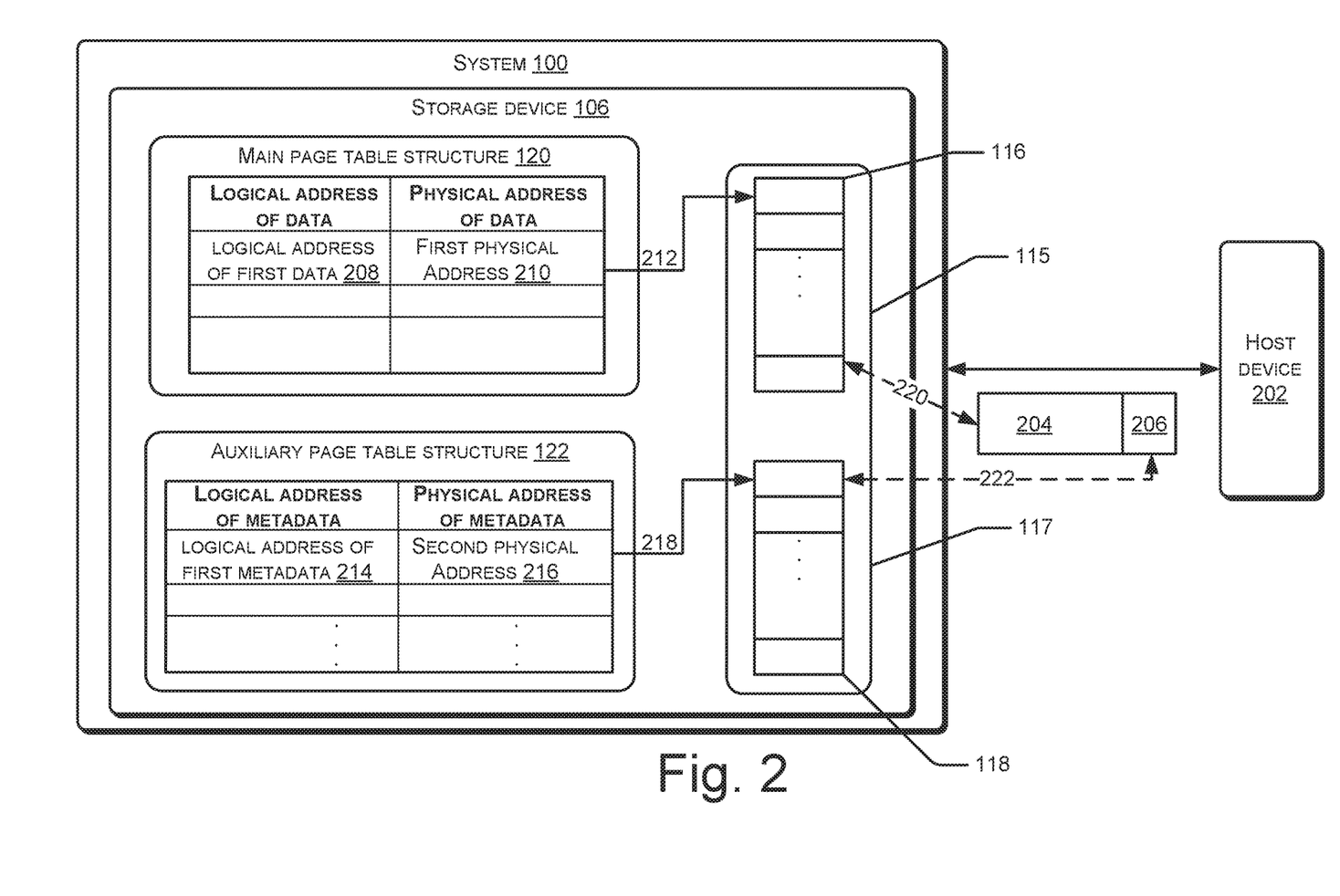
FIG. 2 illustrates data mapping and metadata mapping, according to an example implementation of the present subject matter.

FIG. 2 illustrates data mapping and metadata mapping, according to an example implementation of the present subject matter. As mentioned earlier, a host device 202 may send data to be written to the storage device 106. The host device 202 may utilize a host bus adapter (HBA) (not shown in FIG. 2) for sending the data. The host device 202 may send data in the form chunks for writing. In addition to the data, the host device 202 may also send metadata of each chunk of data for writing to the storage device 106. One of the chunks of data sent by the host device 202 may be the first data 204. Further, as mentioned earlier, the metadata of the first data 204 may be the first metadata 206.

In an example, the first metadata 206 may include data protection information for the first data 204. The data protection information may be information that is useable to detect at least one error in the first data 204 (e.g., corruption of the first data 204 during its transit from the host device 202 to the system 100), correct the at least one error, or a combination thereof. The data protection information may be, for example, one of a checksum and a cyclic redundancy check (CRC) value (hereinafter referred to as "CRC") of the first data 204. As will be understood, the checksum or the CRC of the first data 204 depends on the value of bits in the first data 204. The host device 202 may compute the checksum or CRC of the first data 204 before sending the first data 204 to the storage device 106. If the first data 204 gets corrupted during its transit to the storage device 106, the values of bits in the first data 204 may get changed. Therefore, the checksum or CRC computed by the system 100, upon receiving the first data 204, may be different from the checksum or CRC sent. Therefore, upon comparison of the CRC or checksum computed by the host device 202 and that sent as part of the first metadata 206, it may be determined if the data has got corrupted. In an example, the first metadata 206 may be Data Integrity Field (DIF) for the first data 204. In examples described herein, a DIF may include a CRC, checksum, or the like of the first data 204. In an example, the first data 204 may be 512 bytes in size, and the first metadata 206 may be 8 bytes in size.

The host device 202 may send the first metadata 206 together with the first data 204 for writing to the storage device 106. For instance, as illustrated in FIG. 2, the host device 202 may append the first metadata 206 at the end of the first data 204. Accordingly, when the first data 204 is 512 bytes in size and the first metadata 206 is 8 bytes in size, the host device 202 may send the entire 520 bytes together to the system 100 for writing.

As mentioned earlier, the host device 202 may be provided with a virtual representation of the storage space of the system 100. The host device 202 may attempt to write the first data 204 to the virtual representation provided to it. The host device 202 may also specify a location in the virtual representation in which the first data 204 is to be stored. The location specified by the host device 202 may be referred to as a logical address. In an example, the host device 202 may specify a block in the virtual representation in which the first data 204 is to be written. Accordingly, the logical address may be referred to as logical block address (LBA).

Along with the first data 204, the host device 202 may also send the first metadata 206 to the system 100 for writing to the storage device 106. The host device 202 may also specify the logical address of the first metadata 206, i.e., the location in the virtual representation in which the first metadata 206 is to be stored. In an example, the logical address of the first metadata 206 may be same as that of the first data 204, as will be explained later.

Upon receiving the logical address of the first data 204, the instructions 110 enable creating a mapping between the logical address of the first data 204 and the first physical address. The logical address of the first data 204 is represented by the reference numeral 208 and the first physical address is represented by a reference numeral 210. As mentioned earlier, the first physical address 210 points to the first data page 116, as indicated by the arrow 212. A mapping between the logical address 208 of the first data 204 and the first physical address 210, pointing to the page storing the first data 204, may be referred to as a first data mapping. The first data mapping may be created in the main page table structure 120. The manner in which the first data mapping is created, in an example implementation, will be explained with reference to FIG. 3.

Upon receiving the logical address of the first metadata 206, the instructions 112 enable creating a mapping between the logical address of the first metadata 206 and the second physical address. The logical address of the first metadata 206 is represented by the reference numeral 214 and the second physical address is represented by the reference numeral 216. As mentioned earlier, the second physical address 216 points to the first metadata page 118, as indicated by the arrow 218. A mapping between the logical address 214 of the first metadata 206 and the second physical address 216 may be referred to as a first metadata mapping. The first metadata mapping may be created in the auxiliary page table structure 122. The manner in which the first metadata mapping is created, in an example implementation, will be explained with reference to FIG. 3.

As mentioned earlier, the instructions 114 enable writing the first data 204 to the first data page 116 and writing the first metadata 206 to the first metadata page 118. Further, the first data 204 and the first metadata 206 may also be read from the storage device 106 upon receiving a read request from the host device 202. The reading and writing of the first data 204 is represented by a double-headed arrow 220, and the reading and writing of the first metadata 206 is represented by a double-headed arrow 222. The arrows 220 and 222 are shown dotted to indicate that the host device 202 does not perform the reading and writing of the first data 204 and the first metadata 206 to the storage device 106 directly, and that the reading and writing are mediated by the instructions stored in the machine-readable storage medium 104.

Similar to the first data 204, if any other chunk of data from the host device 202 is to be written to the storage device 106, such a chunk may be written to the first data page 116 or another page of the pages 115. Similar to the first data page 116, the other page to which the chunk is written may also be referred to as a data page. Also, the mapping between the logical address of such data and the physical address of such data may be stored in the main page table structure 120, Similarly, the metadata of such data may be written to the first metadata page 118 or another page of the pages 115. The page to which the metadata is written to may be referred to as a metadata page to indicate that the page stores metadata, and not actual data. Also, the mapping between the logical address of such metadata and the physical address of such metadata may be stored in the auxiliary page table structure 122, Overall, a page of the pages 115 may be used to store either data or metadata.

Figure 3:
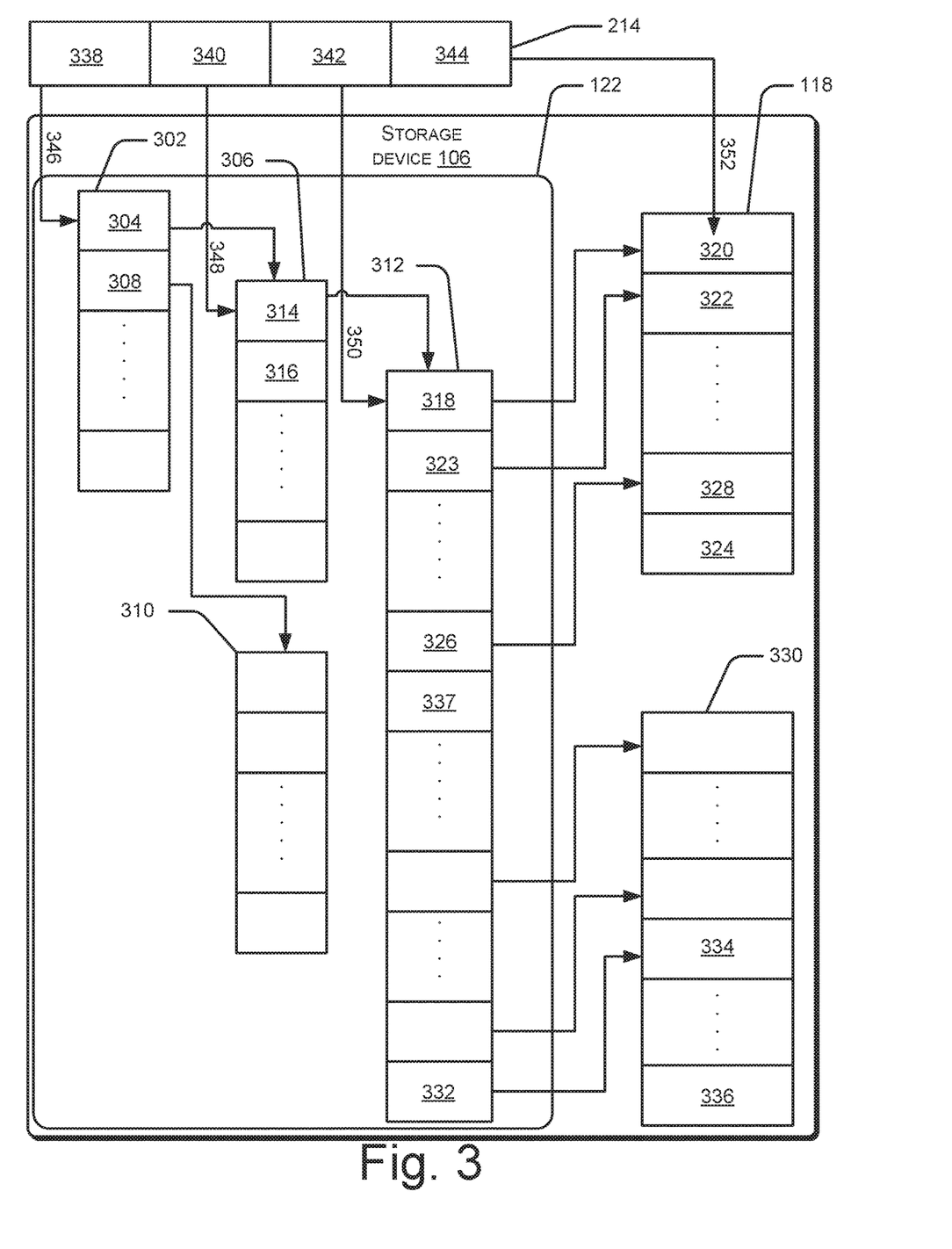
FIG. 3 illustrates creation of first metadata mapping and storage of first metadata in first metadata page, according to an example implementation of the present subject matter.

In this manner, the storage and mapping of the data and corresponding metadata may be made independent of each other, Therefore, the data and the corresponding metadata may be managed independent of each other. For instance, the first data 204 may be moved from the first data page 116 to another data page, for example, for tiering purposes. In such a case, the first data mapping in the main page table structure 120 is to be updated to reflect the new physical address of the first data 204. However, the first metadata 206 may still be stored in the first metadata page 118, and the first metadata mapping is not to be updated, Since the main page table structure 120 and the auxiliary page table structure 122 handle mapping for the pages 115 that are stored in the storage device 106, in an example, the main page table structure 120 and the auxiliary page table structure 122 may be stored in the storage device 106 itself. Further, the main page table structure 120 and the auxiliary page table structure 122 may be implemented using pages of the storage device 106. In accordance with the example, the plurality of pages 115 may refer to all pages of the storage device 106 other than the pages that are part of the main page table structure 120 and the pages that are part of the auxiliary page table structure 122. The main page table structure 120 and the auxiliary page table structure 122, in accordance with an example implementation, will be explained below:

FIG. 3 illustrates creation of the first metadata mapping and storage of the first metadata 206 in the first metadata page 118, according to an example implementation of the present subject matter. As mentioned earlier, the first metadata mapping may be stored in the auxiliary page table structure 122, The auxiliary page table structure 122 may be, for example, a multilevel page table, which has a plurality of levels of pages. An entry in a page table in one level points to another page table in another level. In an example, the multilevel page table includes a first level page table 302 and a plurality of second level page tables. The first level page table 302, being part of the auxiliary page table structure 122, may be referred to as first level auxiliary page table 302 or auxiliary L1 table 302. Similarly, the second level page table may be referred to as a second level auxiliary page table or auxiliary L2 table. The auxiliary L1 table 302 and the auxiliary L2 tables may be pages in the storage device 106.

Each entry in the auxiliary L1 table 302 may point to one auxiliary L2 table. For example, a first entry 304 of the auxiliary L1 table 302 points to a first auxiliary L2 table 306. Similarly, a second entry 308 of the auxiliary L1 table 302 points to a second auxiliary L2 table 310. To point to the first auxiliary L2 table 306, the first entry 304 may store the physical address of the first auxiliary L2 table 306. Similarly, the second entry 308 may store the physical address of the second auxiliary L2 table 310. In an example, each entry in each auxiliary L1 table and each auxiliary L2 table may have a size of 8 bytes. Accordingly, when the auxiliary L1 table and auxiliary L2 tables are 16 KB in size, the number of entries in each of those tables is 2048 (16 KB/8 bytes).

In addition to the auxiliary L1 table 302 and the auxiliary L2 tables, the auxiliary page table structure 122 includes a plurality of third level auxiliary page tables, also referred to as auxiliary L3 tables. Each such auxiliary L3 table is pointed by one entry in one of the auxiliary L2 tables. For instance, a first auxiliary L3 table 312 is pointed by a first entry 314 in the first auxiliary L2 table 306, and a second auxiliary L3 table (not shown in FIG. 3) is pointed to by a second entry 316 in the first auxiliary L2 table 306. Further, each entry in an auxiliary L3 table points to a metadata page. For example, a first entry 318 in the first auxiliary L3 table 312 points to the first metadata page 118. Similar to the entries of the auxiliary L1 tables and auxiliary L2 tables, the entries of the auxiliary L3 tables may also be of 8 bytes in size. Accordingly, auxiliary L3 table may also have 2048 entries.

In an example, the first metadata page 118 may be divided into a plurality of parts, such as a first part 320 and second part 322, each having the same size. The first metadata page 118 may be divided such that each part can store the metadata for the data in one data page. For example, if the first data page 116 is 16 KB in size, the first data page 116 can store 32 chunks of data, each being 512 bytes in size. Further, if the metadata of one chunk of 512 bytes of data is 8 bytes in size, the metadata of all the chunks of data in the first data page 116 will consume 256 bytes (32*8 bytes). Accordingly, when the first metadata page 118 is 16 KB in size, it may be divided into 64 parts (16 KB/256 bytes), each having a size of 256 bytes.

Since the first metadata page 118 is divided into a plurality of parts, each entry in the first auxiliary L3 table 312 may point to one of the plurality of parts. For instance, the first entry 318 may point to the first part 320 of the first metadata page 118. The entries of the first auxiliary L3 table 312 that point to parts of the first metadata page 118 may be referred to as L3 entries corresponding to the first metadata page 118. Further, the entry that points to a particular part may be referred to as the entry corresponding to that part.

In an example, the first entry 318 and other entries corresponding to the first metadata page 118 may point to the first metadata page 118 alone, instead of pointing to a part inside the first metadata page 118. In such a case, the part that a particular entry corresponds to may be inferred based on the position of that entry in the first auxiliary L3 table 312. For example, if the first entry 318 points to the first metadata page 118, it may be inferred that the first entry 318 corresponds to the first part 320 of the first metadata page 118, since the first entry 318 is at the first position in the first auxiliary L3 table 312. Similarly, if a second entry 323 points to the first metadata page 118, it may be inferred that the second entry 323 corresponds to the second part 322 of the first metadata page 118. If the part corresponding to the entry is to be inferred, the entry may be said to indirectly point to the part. Contrarily, if the entry points to the part inside the metadata page, as explained in the previous paragraph, the entry may be said to directly point to the part.

In an example, the metadata of the chunks of data stored in the first data page 116 may be stored in the first part 320 of the first metadata page 118. Therefore, the first metadata 206 of the first data 204, which is one of the chunks of data stored in the first data page 116, may be stored in the first part 320. Similarly, the second part 322 of the first metadata page 118 may be used to store the metadata of the chunks of data stored in a second data page (not shown in FIG. 3). As will be understood, the first metadata page 118 may be used to store the metadata for data stored in 64 data pages.

From the above explanation, it will be understood that the metadata of the data and the auxiliary page tables of the auxiliary page table structure 122 can be stored in pages which are similar to the pages that store data. Therefore, the present subject matter enables utilizing storage devices having its storage space divided into a plurality of identical pages.

In an example, one part of the first metadata page 118 may be used to store metadata of the first metadata page 118. The part storing the metadata of the first metadata page 118 may be a third part 324. The metadata stored in the third part 324 of the first metadata page 118 may include checksum or CRC of the remaining parts of the first metadata page 118. For example, the third part 324 may store a value obtained from a checksum or CRC of all the remaining parts in the first metadata page 118. The value in the third part 324 may be, for example, the DIF for the remaining parts in the first metadata page 118. Since the DIF corresponding to 512 bytes of data may be of 8 bytes in size, if the first metadata page 118 has 64 entries of 256 bytes each, for storing DIF for 16128 bytes (63*256) of data, 252 bytes are to be used. Since the third part 324 has 256 bytes, the DIF for the first metadata page 118 can be accommodated in the third part 324.

As will be understood, if one part of each metadata page is used to store the metadata of that metadata page, and the metadata page includes n parts, then, n−1 parts of the metadata page would be pointed by entries in an auxiliary L3 table. For example, as explained above, if the first metadata page 118 includes 64 parts, 63 of those parts are pointed by the first sixty-three entries in the first auxiliary L3 table 312. The sixty-third entry of the first auxiliary L3 table 312 is represented by the reference numeral 326, which is pointing to the sixty-third part 328 of the first auxiliary L3 table 312. Similarly, the second sixty-three entries of the first auxiliary L3 table 312 may point to the second metadata page. In this manner, the $32^{rd}$ sixty-three entries of the first auxiliary L3 table 312 may point to a thirty-second metadata page (not shown in FIG. 3). Since, as explained earlier, the first auxiliary L3 table 312 may include 2048 entries, the first auxiliary L3 table 312 may have thirty-two entries (2048–32*63) remaining after pointing to parts of thirty-two metadata pages. The remaining 32 entries can point to thirty-two parts of a thirty-third metadata page 330. As illustrated, the last entry 332 of the first auxiliary table 312 points to thirty-second part 334 of the thirty-third metadata page 330. The 32 parts of the thirty-third metadata page 330 can be used to store metadata of 32 pages, as explained earlier, and another part 336 of the thirty-third metadata page 330 can be used to store the metadata of the thirty-third metadata page 330. Further, the remaining 31 parts of the thirty-third metadata page 330 may be left unused. By leaving the remaining parts unused, the first auxiliary L3 table 312 and the metadata pages pointed by its entries may be reserved for a particular storage node, as will be explained with reference to FIG. 4.

As mentioned earlier, in an example, the entries of the first auxiliary L3 table 312 that correspond to the first metadata page 118 may point to the first metadata page 118 alone, and not to the particular parts inside the first metadata page 118. Further, as mentioned earlier, the part to which an entry corresponds may be inferred based on the position of the entry within the first auxiliary L3 table 312. For example, if the $63^{rd}$ entry 326 points to the first metadata page 118, it may be inferred that it corresponds to the $63^{rd}$ part of the first metadata page 118, i.e., the $63^{rd}$ part 328. However, such an inference cannot be made for the subsequent entries of the first auxiliary L3 table 312. For example, a 64th entry 337 of the first auxiliary L3 table 312 may point to a second metadata page (not shown in FIG. 3). Since 63 parts of the second metadata pages are to be pointed by the entries of the first auxiliary L3 table 312, it may not be possible to infer the part of the second metadata page to which the 64th entry 337 corresponds. In such a case, a modulo operation may be used. For example, upon performing 64 mod 63 (remainder obtained upon dividing 64 by 63), 1 is obtained. Accordingly, it may be determined that the 64th entry 337 corresponds to the first part of the second metadata page. As will be understood, here, 63 is used as the divisor because 63 entries of the metadata pages are to be pointed by the entries of the first auxiliary L3 table 312. A similar procedure may be carried out for all entries of the first auxiliary L3 table 312 to determine the part of a metadata page to which it corresponds.

The first metadata mapping in the auxiliary page table structure 122 will now be explained. To perform the first metadata mapping, the logical address 214 of the first metadata 206 may be received by the system 100. As illustrated, in an example, the logical address 214 may include four address parts: a first address part 338, a second address part 340, a third address part 342, and a fourth address part 344. The first address part 338 may be an L1 page index, which points to a particular L1 entry in the auxiliary L1 table 302. For example, the L1 page index may point to the first entry 304 in the auxiliary L1 table 302, as illustrated by the arrow 346. Further, the second address part 340 may be an L2 page index, which points to a particular L2 entry in the auxiliary L2 table pointed by the L1 entry. For example, if the first address part 338 points to the first entry 304 in the auxiliary L1 table 302, and the first entry 304 points to the first auxiliary L2 table 306, the second address part 340 may point to an entry in the first auxiliary L2 table 306. The entry pointed by the second address part 340 may be the first entry, as illustrated by the arrow 348. Similarly, the third address part 342 may be an L3 page index, which points to a particular L3 entry in the auxiliary L3 table pointed by the L2 entry. The entry pointed may be the first entry, as illustrated by the arrow 350. Further, the fourth address part 344 may be an offset, which may indicate a sub-part within the part that is pointed by the particular L3 entry. The indication of the sub-part is illustrated by the arrow 352. When the parts of the metadata pages are 256 bytes in size and store the metadata of an entire data page of 16 KB size, as explained above, each sub-part may have a size of 8 bytes. Further, each part may have 32 sub-parts.

In an example, the logical address 214 may be 38 bits in length. Further, each of the first address part 338, second address part 340, and third address part 342 is 11 bits in length and the fourth address part 344 may be 5 bits in length. Accordingly, the first address part 338 may be used to address the 2048 (2^11) entries in the auxiliary L1 page 302. Similarly, the second address part 340 and third address part 342 may be used to address the 2048 entries in an auxiliary L2 page and the 2048 entries in an auxiliary L3 page, respectively. Further, the remaining 5 bits may be used to address 32 sub-parts within a part of a metadata page 118.

As will be understood from the above explanation, upon receiving the logical address 214, the instructions 112 may enable walking down the auxiliary page table structure 122 using the auxiliary table pointed by the auxiliary table in the previous level and using entries pointed by the address parts. If, during such walking down, an entry is encountered that is not pointing to an existing page, it may be because the entry may not have been written to earlier. For example, as illustrated, consider a case in which the first address part 338 points to the first entry 304 in the auxiliary L1 page 302, the first entry 304 points to the first auxiliary L2 page 306, the second address part 340 points to the first entry 314 in the first auxiliary L2 page 306, and the first entry 314 is empty. This may be because the first entry 314 may be hitherto unwritten to. An empty entry or an entry not pointing to an existing page may be referred to as an invalid entry.

Upon reaching an invalid entry, the instructions 112 may enable creation of a valid entry. For instance, the instructions 112 may write a physical address of an empty page in that entry. Therefore, the empty page pointed by the entry may be referred. For example, if the first entry 314 was previously empty, a physical address of an empty page may be written to the first entry 314. Such an empty page may then become the first auxiliary L3 page 312. Similarly, when the invalid entry is the entry in the first auxiliary L3 page 312, a physical address of a metadata page may be written to that entry. For example, if the invalid pointed entry is the first entry 318, the physical address of the first metadata page 118 may be written to the first entry 318. In cases where the entry in the first auxiliary L3 page 312 is to point to a part in a metadata page, the physical address of the part may be written to that entry. For example, the physical address of the first part 320 may be written to the first entry 318.

As will be understood from the above explanation, by walking down the auxiliary page table structure 122 using the logical address 214 and using the entries in the various auxiliary page tables, the part and the sub-part within the part in which the first metadata 206 is to be stored may be identified. For example, using the logical address 214 and the entries in the auxiliary L1 table 302, the first auxiliary L2 table 306, and the first auxiliary L3 table 312, it may be identified that the first metadata 206 is to be stored as a first sub-part in the first part 320 of the first metadata page 118. Accordingly, the second physical address 216 may point to the first sub-part in the first part 320 of the first metadata page 118, Therefore, using the entries of the auxiliary page tables, the logical address 214 of the first metadata 206 is mapped to the physical address of the first metadata 206.

Further, the writing of addresses in the invalid entries to point to new pages or to new parts of pages enables creation of the mapping between the logical address 214 and the second physical address 216. The writing of physical addresses to entries of the auxiliary page table structure 122 such that a mapping is created between the logical address 214 of the first metadata 206 and the second physical address 216, pointing to a page to which the first metadata 206 is to be stored, may be referred to as creation of the first metadata mapping between the logical address 214 and the second physical address 216.

Similarly, the writing of physical addresses in the main page table structure 120, as will be explained below, such that a mapping between the logical address 208 of the first data 204 and the first physical address 210, pointing to a page to which the first data 204 is to be stored, may be referred to as the creation of the first data mapping between the logical address 208 of the first data 204 and the first physical address 210.

In an example, the main page table structure 120 may be similar in structure to the auxiliary page table structure 122. For instance, the main page table structure 120 may be a multilevel page table having a first level page table, a plurality of second level page tables, and a plurality of third level page tables (not shown in FIG. 3), The first level page table, second level page table, and third level page table of the main page table structure 120 may be referred to as first level main page table, second level main page table, and third level main page table, respectively, and as main L1 page table, main L2 page table, and main L3 page table, respectively.

If the main page table structure 120 is similar in structure to the auxiliary page table structure 122, a single logical address may be used to create both the first data mapping and first metadata mapping. For instance, if both the main page table structure 120 and the auxiliary page table structure 122 have three levels of page tables, as explained above, the logical address 214, having four address parts, can be used to address a location in the first data page 116 and the first metadata page 118. As explained above, the four address parts can be used to address a sub-part in a part of the first metadata page 118. Similarly, the first address part 338 can be used to point to an entry in the main L1 page table and the second address part 340 can be used to point to an entry in the main L2 page table that is pointed by the entry in the main L1 page table. Further, the third address part 342 can be used to point to a particular entry in the main L3 page table that is pointed by the entry in the main L2 page table. The entry in the main L3 page table can then point to a particular data page, such as the first data page 116, and the fourth address part 344 can point to a particular part of the data page.

In an example, each part of the data page may be referred to as a block of the data page. Each block of the data page may be, for example, one sector in the storage device 106. The size of the block of the data page and the size of the chunk of data sent by the host device 202 may be the same. When the size of the chunk of data is 512 bytes, each block of the data page may be 512 bytes in size. As will be understood, the metadata of the data in one block of a data page can be accommodated in one sub-part of one part of a metadata page. Therefore, using a single logical address, both the block of the data page that is to store a chunk of data and the sub-part of the part of the metadata page that is store the metadata of the chunk of data can be located.

Since a single logical address can be used, the logical address 208 of the first data 204 and the logical address 214 of the first metadata 206 may be the same. Accordingly, the host device 202 may use a single logical address to write a chunk of data and its corresponding metadata. Therefore, the present subject matter can be implemented without a change in the way the host device 202 addresses its data stored in the storage device 106. Further, by making the structure of the auxiliary page table structure 122 similar to that of the main page table structure 120, the present subject matter enables using similar addressing structures, regardless of their usage for addressing data or metadata.

Still further, by storing a chunk of data in a sector that is part of a data page and by storing the corresponding metadata in a sector that is part of a metadata page, the present subject matter eliminates the dependence on storage devices with 520 byte sectors. For instance, even if the host device 202 sends the first data 204 of 512 bytes along with the first metadata 206 of 8 bytes, by storing the first data 204 in a sector of the first data page 116 and storing the first metadata 206 in a sector of the first metadata page 118, it is ensured that the present subject matter can be implemented using 512 byte sectors. Thus, the present subject matter enables utilizing a storage device having its storage space divided into a plurality sectors having a number of bytes that is a power of two (e.g., 512 bytes). Since storage devices with sectors having a number of bytes that is a power of two are simpler to manufacture and less expensive, the present subject matter simplifies the storage of data and metadata, such as DIF, of host devices in storage devices of storage systems.

The following description will be explained with reference to a scenario in which the logical address 208 of the first data 204 is same as the logical address 214 of the first metadata 206. For instance, the logical address 208 may have the four address parts 338-344.

In addition to writing the first data 204 and first metadata 206 to the storage device 106, the host device 202 can also read the first data 204 and first metadata 206 stored in the storage device 106. For this, the host device 202 may send a read request to read the first data 204 and the first metadata 206 to the system 100. The read request may include the logical address 208. The system 100 may then divide the logical address 208 into the four address parts, access the main page table structure 120 and the auxiliary page table structure 122 to identify the block having the first data 204 and the sub-part having the first metadata 206. By accessing the main page table structure 120, the system 100 can locate the first data page 116, in which the first data 204 is stored. Similarly, by accessing the auxiliary page table structure 122, the system 100 can locate the first metadata page 118, in which the first metadata 206 is stored.

Subsequently, the system 100 can provide the first data 204 and first metadata 206 to the host device 202.

In an example, when the first metadata 206 includes the checksum or CRC of the first data 204 (e.g., when the first metadata 206 is the DIF for the first data 204), subsequent to retrieving the first data 204 and the first metadata 206 from their respective pages, the system 100 may compute checksum or the CRC of the first data 204 and compare the computed checksum or the CRC with the first metadata 206. If the computed checksum or CRC is same as that in the first metadata 206, the system 100 can ensure that no data corruption has taken place since the first data 204 and the first metadata 206 were stored in the storage device 106.

As explained above, the plurality of metadata pages may be used to store the metadata of the data in the data pages. Further, the metadata of the metadata can be stored in one part of a metadata page. The manner in which the metadata of the physical addresses stored in the main page table structure 120 and in the auxiliary page table structure 122 is stored will be explained with reference to FIG. 4.

Although, in the description of FIG. 3, the auxiliary page table structure 122 and the main page table structure 120 are explained with reference to multilevel page tables, the auxiliary page table structure 122 and the main page table structure 120 may be implemented using any other existing types of page table structures. As will be appreciated, the usage of the existing types page table structures simplifies the implementation of the present subject matter.

Figure 4:
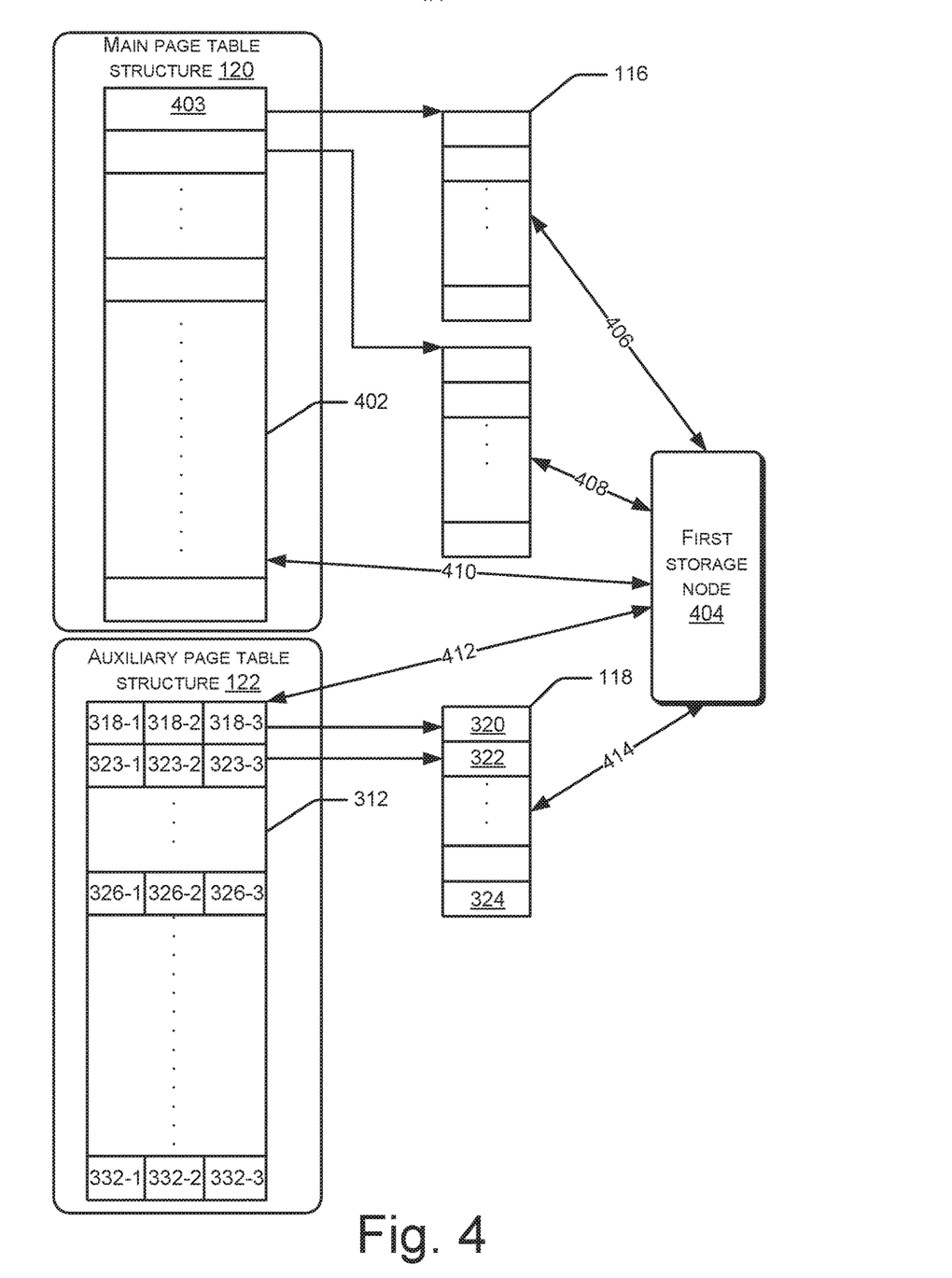
FIG. 4 illustrates the storage of metadata of addresses stored in main page table structure and auxiliary page table structure, according to example implementations of the present subject matter.

FIG. 4 illustrates the storage of metadata of physical addresses stored in the main page table structure 120 and auxiliary page table structure 122, according to example implementations of the present subject matter. Although the main page table structure 120 and auxiliary page table structure 122 may include a plurality of levels of page tables, here, a first main L3 page table 402 and the first auxiliary L3 page table 312 alone are shown for the sake of clarity. Similar to the first main L3 page table 402, the main page table structure 120 may include a plurality of other main L3 tables. Further, a first entry 403 of the first main L3 page table 402 points to the first data page 116.

As explained earlier, each entry in the first main L3 page table 402 points to a data page and each entry in the first auxiliary L3 page table 312 points to a part of a metadata page. For pointing to the data page and the part of the metadata page, the entries in the first main L3 page table 402 and the first auxiliary L3 page table 312 may include the addresses of the data page and the part of the metadata page, respectively. In an example, not all bits in each entry of the first auxiliary L3 page table 312 are to be used to point to the part of the metadata page 118, In such a case, some bits of each entry may be used to store metadata of the addresses stored in the first main L3 page table 402 and the first auxiliary L3 page table 312.

If the first main L3 page table 402 and the first auxiliary L3 page table 312 are pages having a size of 16 KB, and 512 bytes of data have 8 bytes of corresponding metadata, the metadata corresponding to the 16 KB will consume 256 bytes. Therefore, to store the metadata of both the first main L3 page table 402 and the first auxiliary L3 page table 312, 512 bytes are to be used. These 512 bytes may be equally divided among each entry in the first auxiliary L3 page table 312. As mentioned earlier, the number of entries in the first auxiliary L3 page table 312 may be 2048. Accordingly, each entry in the first auxiliary L3 page table 312 may then have to store 2 bits (512 bytes/2048 entries) of metadata. In an example, each entry in the first auxiliary L3 page table 312 may store 1 bit of metadata for the first main L3 page table 402 and 1 bit of metadata for the first auxiliary L3 page table 312. Accordingly, each entry in the first auxiliary L3 page table 312 may have a first portion, a second portion, and a third portion. The first portion is 1 bit long and stores a portion of metadata of the first main L3 page table 402, the second portion is 1 bit long and stores a portion of metadata of the first auxiliary L3 page table 312, and the third portion is 62 bits long and stores the address of a part of a metadata page. The three portions for the entries 318, 323, 326, and 332 in the first auxiliary L3 page table 312 are illustrated in FIG. 4. The first, second, and third portions of the first entry 318 are represented as 318-1, 318-2, and 318-3, respectively. Similarly, the portions of the other entries are represented as 323-1, 323-2, and 323-3, 326-1, 326-2, and 326-3, and 332-1, 332-2, and 332-3.

In the manner as explained above, the first portion of each entry of each auxiliary page table can store a portion of metadata of a main page table and the second portion of each entry of each auxiliary page table can store a portion of metadata of the auxiliary page table. In an example, the metadata of an auxiliary page table in the auxiliary page table structure 122 and the metadata of its corresponding main page table in the main page table structure 120 are stored in the entries in that auxiliary page table. For example, the metadata of the main L1 page table (not shown in FIG. 4) and the auxiliary L1 table 302 (not shown in FIG. 4) can be stored in the entries of the auxiliary L1 table 302. The storage of the metadata of the main page table structure 120 and the auxiliary page table structure 122 in the entries in the auxiliary page table structure 122 prevents the use of a separate page for storing the metadata.

As mentioned earlier, in an example, the first auxiliary L3 table 312 may point to several metadata pages, such as the first metadata page 118 and the thirty-third metadata page 330 (not shown in FIG. 4). Correspondingly, the first main L3 table 402 may point to 33 data pages, which include the first data page 116. Further, as mentioned earlier, some entries of the 33$^{rd}$ metadata page 330 may be left blank, i.e., may not store any metadata. Correspondingly, some entries of thirty-third data page (not shown in FIG. 4) may also be left blank. In such a case, the first auxiliary L3 table 312, the first main L3 page table 402, the 33 metadata pages (from the first metadata page 118 to the 33$^{rd}$ metadata page 330), and the 33 data pages may be reserved for writing by a first storage node 404 of a plurality of storage nodes that form part of the storage controller. Accordingly, the changes to these pages may be made by the first storage node 404, and not by any other storage node. The reservation of the first auxiliary L3 table 312, the first main L3 page table 402, the 33 metadata pages, and the 33 data pages is represented by the arrows 406-414. Similarly, other auxiliary L3 tables, main L3 page tables, metadata pages, and data pages may be reserved for writing by the other storage nodes. The reservation of pages in this manner enables the storage nodes to write data to their own pages, and prevents conflict among the storage nodes.

Further, since the main L1 table, the plurality of main L2 tables, the auxiliary L1 table 302, and the plurality of auxiliary L2 tables are common for a plurality of storage nodes, these pages may be reserved for writing by a storage node different from the plurality of storage nodes. Accordingly, these tables are prevented from being written to by the plurality of storage nodes.

Although the main page table structure 120 and the auxiliary page table structure 122 are shown as having a single L1 page table, in an example, the main page table structure 120 and the auxiliary page table structure 122 may have more than one L1 page table. In such a case, the main page table structure 120 and the auxiliary page table structure 122 may each include a superstructure having entries pointing to the L1 page tables.

Figure 5:
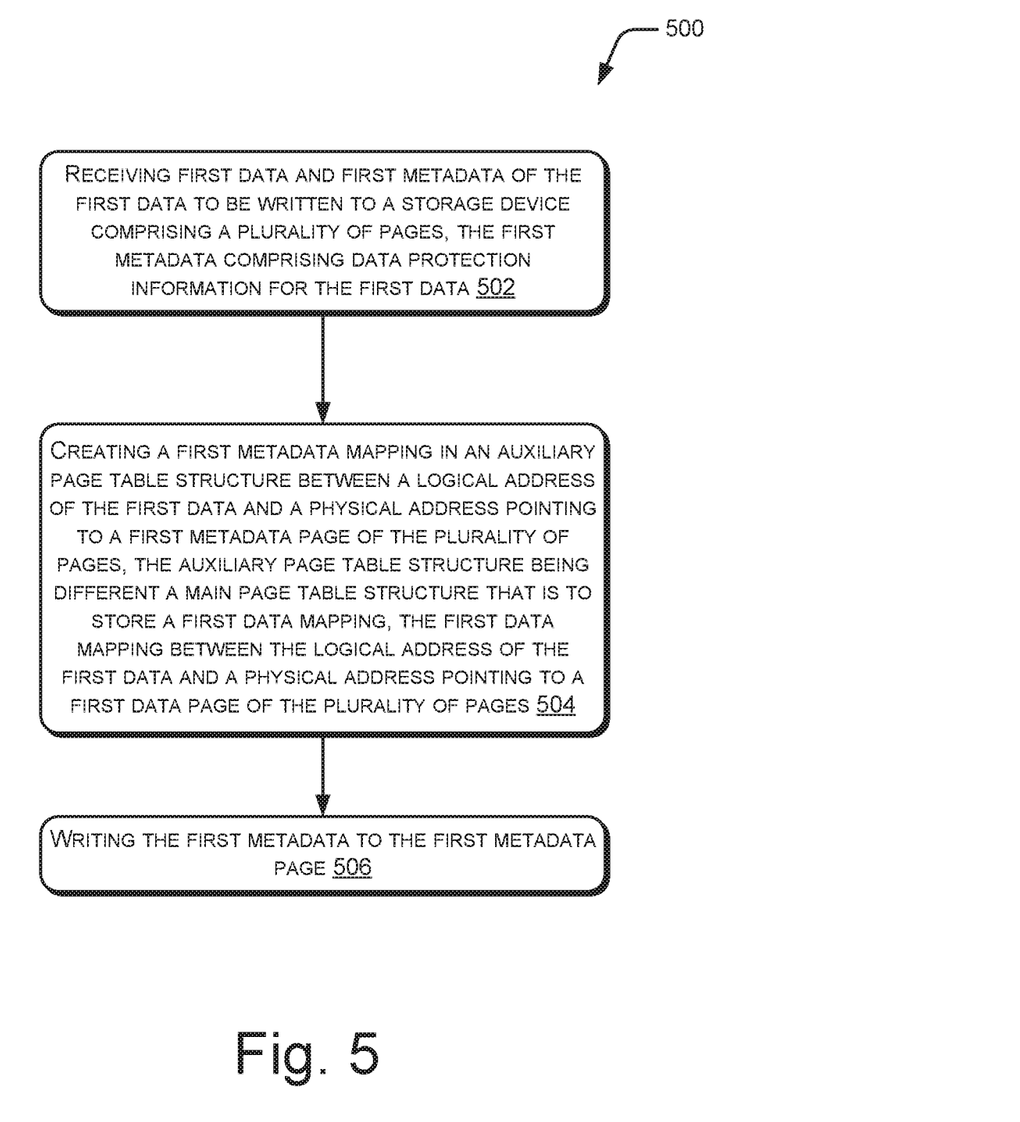
FIG. 5 illustrates a method for data and metadata storage in storage devices, according to example implementations of the present subject matter.
Figure 6:
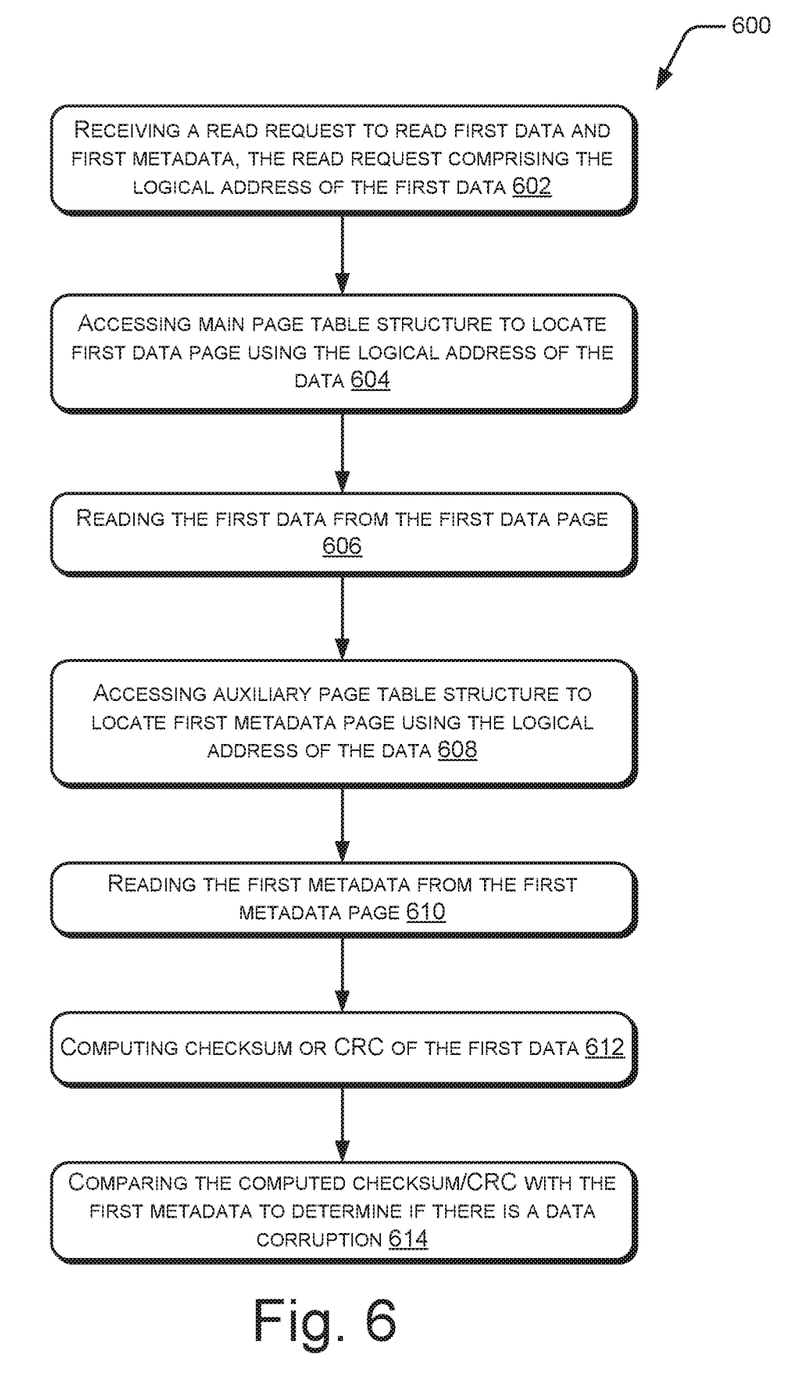
FIG. 6 illustrates a method for reading first data and first metadata, according to an example implementation of the present subject matter.

FIGS. 5 and 6 illustrate methods 500 and 600, respectively, for data and metadata storage in storage devices, according to example implementations of the present subject matter.

The order in which the methods 500 and 600 are described is not intended to be construed as a limitation, and any number of the described method blocks may be combined in any order to implement the methods 500 and 600, or an alternative method. Furthermore, the methods 500 and 600 may be implemented by processor(s) or computing device(s) through any suitable hardware, non-transitory machine-readable instructions, or a combination thereof.

It may be understood that steps of the methods 500 and 600 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 500 and 600 may be implemented in a variety of systems, the methods 500 and 600 are described in relation to the system 100, for ease of explanation. In an example, the steps of the methods 500 and 600 may be performed by a processing resource, such as the processor 102.

Referring to method 500, at block 502, first data and first metadata of the first data are received for being written to a storage device, such as the storage device 106. The storage device includes a plurality of pages, such as the pages 115. The first data and first metadata may be received from a host device, such as the host device 202, and may be, for example, the first data 204 and the first metadata 206. Further, the first metadata may include data protection information for the first data. The first metadata may include, for example, the DIF for the first data. The DIF for the first data may include one of a checksum and a Cyclic Redundancy Check (CRC) of the first data.

At block 504, a first metadata mapping may be created in an auxiliary page table structure. The first metadata mapping may be between a logical address of the first data and a physical address pointing to a first metadata page of the plurality of pages. The auxiliary page table structure is different from a main page table structure that is to store a first data mapping. The first data mapping may be between the logical address of the first data and a physical address pointing to a first data page of the plurality of pages. The first metadata mapping may be created, for example, by writing physical addresses of empty pages in entries of auxiliary page tables, as explained with reference to FIG. 3.

In an example, the auxiliary page table structure includes a first level auxiliary page (auxiliary L1) table, a plurality of second level auxiliary page (auxiliary L2) tables, and a plurality of third level auxiliary page (auxiliary L3) tables. Further, an entry in the auxiliary L1 table points to one of the plurality of auxiliary L2 tables and an entry in an auxiliary L2 table points to one of the plurality of auxiliary L3 tables. Still further, an entry in one of the plurality of auxiliary L3 tables points to a part of the first metadata page. The auxiliary page table structure may be, for example, the auxiliary page table structure 122. Accordingly, the auxiliary L1 table may be the auxiliary L1 table 302, one of the auxiliary L2 tables may be the first auxiliary L2 table 306, and one of the auxiliary L3 tables may be the first auxiliary L3 table 312.

Further, the main page table structure may be, for example, the main page table structure 120. The logical address of the first data may be, for example, the logical address 208, the first metadata page may be, for example, the first metadata page 118, and a physical address pointing to the first metadata page may be, for example, the second physical address 216. Further, the first data page may be, for example, the first data page 116 and the physical address pointing to the first data page may be, for example, the first physical address 210.

At block 506, the first metadata is written to the first metadata page.

In addition to creating the first metadata mapping, the method 500 may also include creating the first data mapping. Further, in addition to writing the first metadata, the method 500 may also include writing the first data to the first data page. The creation of the first metadata mapping and first data mapping may be performed in the manner as explained with reference to FIG. 3.

FIG. 6 illustrates a method 600 for reading the first data and first metadata, according to an example implementation of the present subject matter.

At block 602, a read request is received for reading the first data and the first metadata. The read request may be received from the host device, and may include the logical address of the first data.

At block 604, the main page table structure is accessed to locate the first data page, in which the first data is stored, using the logical address of the first data. For locating the first data page, the logical address may be divided into different address parts, such as the address parts 338-344. Further, using the different address parts and the entries stored in the main page tables of the main page table structure, the first data page may be located, as explained earlier. Further, the block in the first data page storing the first data may also be located.

Subsequently, at block 606, the first data may be read from the block in the first data page that stores the first data.

At block 608, the auxiliary page table structure is accessed to locate the first metadata page, in which the first metadata is stored, using the logical address of the first data. For locating the first metadata page, the different address parts and the entries stored in the auxiliary page tables of the auxiliary page table structure may be utilized, as explained earlier. Further, the part in the first metadata page that stores the first metadata, and the sub-part within the part, may also be located.

Thereafter, at block 610, the first metadata may be read from the sub-part of the first metadata page.

If the first metadata includes a checksum or a CRC of the first data, upon reading the first metadata, at block 612, the checksum or the CRC of the first data may be computed.

At block 614, the computed checksum or CRC may be compared with the first metadata. If the computed value is same as the corresponding value in the first metadata, it may be determined that there is no data corruption since the time the first data and first metadata are stored in the storage device.

Figure 7:
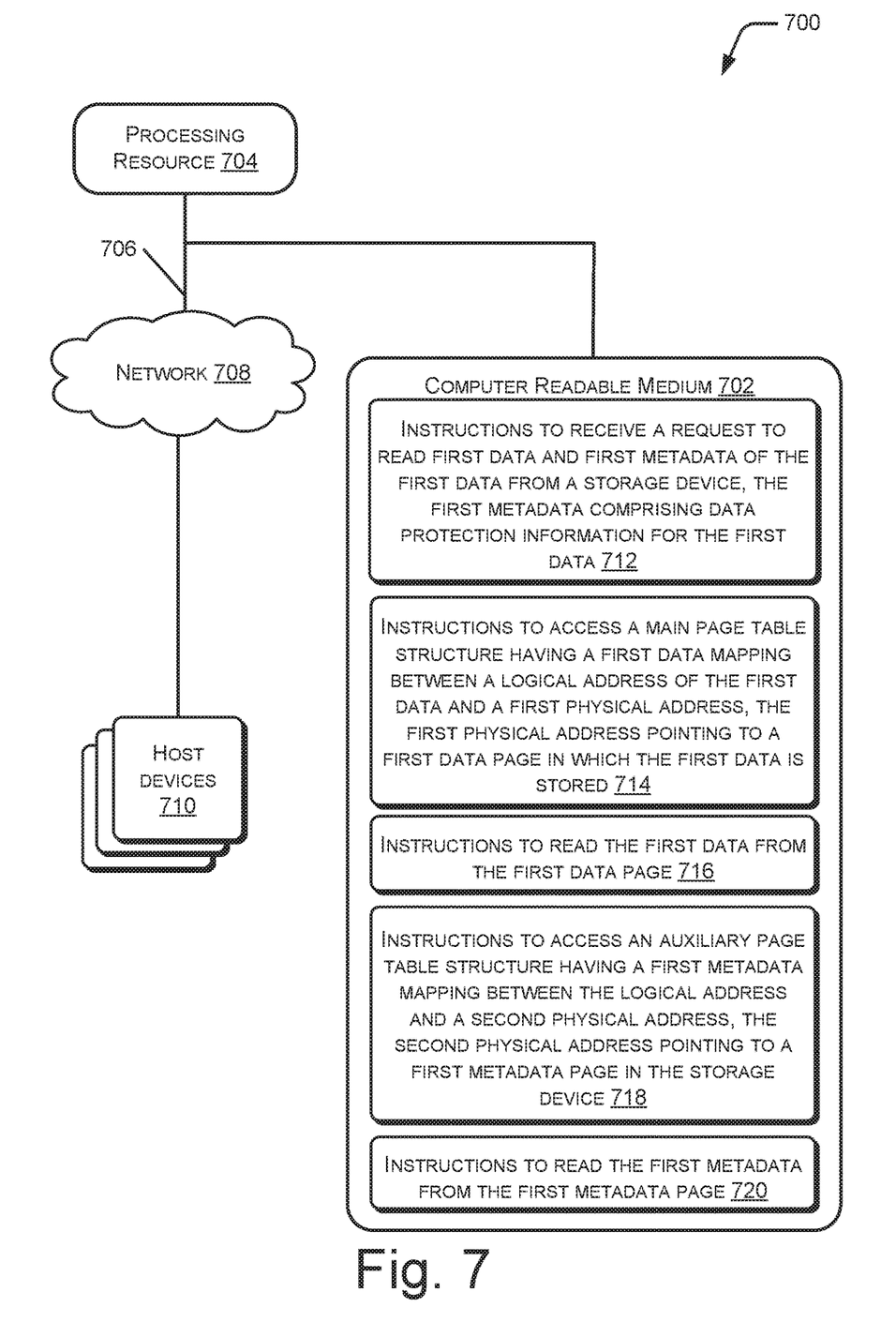
FIG. 7 illustrates a computing environment, implementing a non-transitory computer-readable medium for data and metadata storage in storage devices, according to an example implementation of the present subject matter.

FIG. 7 illustrates a computing environment 700, implementing a non-transitory computer-readable medium 702 for data and metadata storage in storage devices, according to an example implementation of the present subject matter.

In an example, the non-transitory computer-readable medium 702 may be utilized by a system, such as the system 100. In an example, the computing environment 700 may include a processing resource 704 communicatively coupled to the non-transitory computer-readable medium 702 through a communication link 706.

In an example, the processing resource 704 may be implemented in a system, such as the system 100. The processing resource 704 may be the processor 102. The non-transitory computer-readable medium 702 may be, for example, an internal memory device or an external memory device. In an implementation, the communication link 706 may be a direct communication link, such as any memory read/write interface. In another implementation, the communication link 706 may be an indirect communication link, such as a network interface. In such a case, the processing resource 704 may access the non-transitory computer-readable medium 702 through a network 708. The network 708 may be a single network or a combination of multiple networks and may use a variety of different communication protocols.

The processing resource 704 and the non-transitory computer-readable medium 702 may also be communicatively coupled to a several host devices over the network 708. The host devices may include, for example, the host device 202.

In an example implementation, the non-transitory computer-readable medium 702 includes a set of computer-readable instructions to facilitate data and metadata storage in storage devices, such as a storage device 106.

Referring to FIG. 7, in an example, the non-transitory computer-readable medium 702 includes instructions 712 that cause the processing resource 704 to receive a request to read first data and first metadata of the first data stored in a storage device. The request includes a logical address of the first data. The first data may be, for example, the first data 204, and the first metadata may be, for example, the first metadata 206. Correspondingly, the logical address of the first data may be, for example, the logical address 208. The storage device may be, for example, the storage device 106.

The non-transitory computer-readable medium 702 includes instructions 714 that cause the processing resource 704 to access a main page table structure having a first data mapping between the logical address of first data and a first physical address. The first physical address points to a first data page in which the first data is stored. The main page table structure may be, for example, the main page table structure 120. Further, the first data page may be, for example, the first data page 116, and the first physical address may be, for example, the first physical address 210.

The non-transitory computer-readable medium 702 includes instructions 716 that cause the processing resource 704 to read the first data from the first data page.

The non-transitory computer-readable medium 702 includes instructions 718 that cause the processing resource 704 to access an auxiliary page table structure having a first metadata mapping between the logical address of first data and a second physical address. The second physical address points to a first metadata page in the storage device. The auxiliary page table structure may be, for example, the auxiliary page table structure 122, the first metadata page may be, for example, the first metadata page 118, and the second physical address may be, for example, the second physical address 216.

The non-transitory computer-readable medium 702 includes instructions 720 that cause the processing resource 704 to read the first metadata from the first metadata page.

In an example, the first metadata may include data protection information for the first data. For instance, the first metadata includes a checksum or a CRC of the first data. Accordingly, in response to reading the first data, the instructions cause the processing resource 704 to compute the checksum or the CRC of the first data and compare the computed checksum or the CRC with the first metadata to determine if there is a data corruption. This may be performed, for example, in the manner as explained with reference to FIG. 6.

Further, in an example, prior to receiving the logical address of the first data for reading the first data, the instructions are executable by the processing resource 704 to receive the first data and first metadata to be written to the storage device. The first data and first metadata may be received, for example, from the host device 202. Upon receiving, the first data mapping may be created in the main page table structure. The first data mapping may be created in the manner explained with reference to FIG. 3. Also, the first data may be written to the first data page. Further, the first metadata mapping may be created in the auxiliary page table structure and the first metadata may be written to the first metadata page.

The present subject matter enables managing data independently of metadata of the data when the data and metadata are stored in a storage device. Also, the present subject matter can be implemented using storage devices having sectors that are 512 bytes in size, thereby being simpler and more economical. Further, even though the present subject matter utilizes two different page table structures—one for data mapping and another for metadata mapping such page table structures are similar to each other, thereby not adding any complexity in the provision of a new page table structure. Still further, the present subject matter can be implemented without the host device having to make any change to the way it addresses the data and metadata.

The present subject matter can be used for any layout of the page table structures used for accessing the data and metadata. Further, the auxiliary page table structure of the present subject matter can be used as an add-on to the existing main page table structure. For instance, the auxiliary page table structure may be used in cases where the data is accompanied by its corresponding metadata. Therefore, the present subject matter is highly flexible. Still further, the creation of the data mapping and the metadata mapping may be performed by a storage controller of a storage system, and is not to be performed by a disk layer that includes the storage devices. Therefore, the management of the metadata can be transparent to the storage controller.

Further, in addition to the metadata of the data stored in the data pages, in the metadata pages, in the main page table structure, and in the auxiliary page table structure, the metadata pages may be used to store other metadata as well. Such metadata includes checksum/CRC of bitmap pages that keep track of allocated and free pages, checksum/CRC of start address of main L1 page table, and checksum/CRC of start address of the auxiliary L1 page table.

Although implementations of data and metadata storage in storage devices have been described in language specific to structural features and/or methods, it is to be understood that the present subject matter is not necessarily limited to the specific features or methods described. Rather, the specific features and methods are disclosed and explained as example implementations.

We claim:

1. A method comprising:
  receiving, by a processing resource, first data and first metadata of the first data to be written to a storage device, the first metadata comprising data protection information for the first data and the storage device comprising a plurality of pages;
  creating, by the processing resource, a first metadata mapping in an auxiliary page table structure between a logical address of the first data and a physical address pointing to a first metadata page of the plurality of pages, the auxiliary page table structure being different from a main page table structure that is to store a first data mapping; the first data mapping between the logical address of the first data and a physical address pointing to a first data page of the plurality of pages; and writing, by the processing resource; the first metadata to the first metadata page.

2. The method of claim 1, wherein the first metadata comprises a Data Integrity Field (DIF) for the first data, wherein the DIF comprises one of a checksum and a Cyclic Redundancy Check (CRC) of the first data.

3. The method of claim 2, further comprising:
creating the first data mapping; and
writing the first data to the first data page.

4. The method of claim 1; wherein
the auxiliary page table structure comprises a first level auxiliary page (auxiliary L1) table; a plurality of second level auxiliary page (auxiliary L2) tables, and a plurality of third level auxiliary page (auxiliary L3) tables,
an entry in the auxiliary L1 table points to one of the plurality of auxiliary L2 tables,
an entry in an auxiliary L2 table points to one of the plurality of auxiliary L3 tables, and
an entry in one of the plurality of auxiliary L3 tables points to a part of the first metadata page.

5. The method of claim 1, comprising:
receiving a read request to read the first data and the first metadata, the read request comprising the logical address of the first data;
accessing the main page table structure to locate the first data page, in which the first data is stored, using the logical address of the first data; and
accessing the auxiliary page table structure to locate the first metadata page, in which the first metadata is stored, using the logical address of the first data.

6. A system comprising:
a processor;
a storage device storing:
a plurality of pages;
a main page table structure; and
an auxiliary page table structure; and
a machine-readable storage medium comprising instructions executable by the processor to:
receive first data and first metadata of the first data from a host device, wherein the first metadata comprises data protection information for the first data;
create a first data mapping in the main page table structure between a logical address of the first data and a first physical address, the first physical address pointing to a first data page of the plurality of pages;
create a first metadata mapping in the auxiliary page table structure between a logical address of the first metadata and a second physical address, the second physical address pointing to a first metadata page of the plurality of pages;
write the first data to the first data page; and
write the first metadata to the first metadata page.

7. The system of claim 6, wherein the first metadata comprises one of a checksum and a Cyclic Redundancy Check (CRC) of the first data.

8. The system of claim 6, wherein the first data is of 512 bytes and the first metadata is of 8 bytes.

9. The system of claim 6, wherein
the auxiliary page table structure comprises an auxiliary page table having a plurality of entries,
the main page table structure comprises a main page table,
a first portion of each entry of the auxiliary page table is to store a portion of metadata of the main page table, and
a second portion of each entry of the auxiliary page table is to store a portion of metadata of the auxiliary page table.

10. The system of claim 6, wherein
the auxiliary page table structure comprises a first level auxiliary page (auxiliary L1) table and a plurality of second level auxiliary page (auxiliary L2) tables, and
an entry in the auxiliary L1 table points to one of the plurality of auxiliary L2 tables.

11. The system of claim 6, wherein
the first metadata page comprises a plurality of parts,
a first part of the plurality of parts is to store metadata of chunks of data stored in the first data page,
a second part of the plurality of parts is to store metadata of chunks of data stored in a second data page, and
a third part of the plurality of parts is to store metadata of the first metadata page.

12. The system of claim 6, wherein each page of the plurality of pages comprises a plurality of storage device sectors, and each storage device sector is 512 bytes in size.

13. The system of claim 6, wherein the logical address of the first data and the logical address of the first metadata are same, and wherein the instructions are executable by the processor to:
receive a read request to read the first data and the first metadata, the read request comprising the logical address of the first data;
access the main page table structure to locate the first data page, in which the first data is stored, using the logical address of the first data; and
access the auxiliary page table structure to locate the first metadata page, in which the first metadata is stored, using the logical address of the first data.

14. The system of claim 10, wherein
the auxiliary page table structure comprises a plurality of third level auxiliary page (auxiliary L3) tables,
an entry in one of the plurality of auxiliary 2 tables points to one of the plurality of auxiliary L3 tables, and
an entry in a first auxiliary L3 table points to a part of the first metadata page.

15. The system of claim 14, wherein the first auxiliary L3 table and the first metadata page, pointed by the first auxiliary L3 table, are reserved for writing by a first storage node.

16. The system of claim 15, wherein
the main page table structure comprises a plurality of third level main page (main L3) tables,
an entry in a first main L3 table points to the first data page,
the first main L3 table and the first data page, pointed by the first main L3 table, are reserved for writing by the first storage node.

17. A non-transitory computer-readable medium comprising instructions, the instructions being executable by a processing resource to:
receive a request to read first data and first metadata of the first data stored in a storage device, the first metadata comprising data protection information for the first data and the request comprising a logical address of first data;

access a main page table structure having a first data mapping between the logical address of first data and a first physical address, the first physical address pointing to a first data page in which the first data is stored;

read the first data from the first data page;

access an auxiliary page table structure having a first metadata mapping between the logical address of first data and a second physical address, the second physical address pointing to a first metadata page in the storage device; and read the first metadata from the first metadata page.

18. The non-transitory computer-readable medium of claim 17, wherein the first metadata comprises one of a checksum and a Cyclic Redundancy Check (CRC) of the first data.

19. The non-transitory computer-readable medium of claim 18, wherein, in response to reading the first data, the instructions are executable by the processing resource to:

compute the checksum or the CRC of the first data; and compare the computed checksum or the CRC with the first metadata to determine if there is a data corruption.

20. The non-transitory computer-readable medium of claim 17, wherein, prior to receiving the logical address, the instructions are executable by the processing resource to:

receive the first data and first metadata to be written to the storage device;

create the first data mapping in the main page table structure;

write the first data to the first data page;

create the first metadata mapping in the auxiliary page table structure; and write the first metadata to the first metadata page.

\* \* \* \* \*